US009876814B2

(12) United States Patent
McKinney

(10) Patent No.: US 9,876,814 B2
(45) Date of Patent: Jan. 23, 2018

(54) DETECTING DOMAINS GENERATED BY A DOMAIN GENERATION ALGORITHM

(71) Applicant: Cisco Technology, Inc., San Jose, CA (US)

(72) Inventor: Steve McKinney, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 213 days.

(21) Appl. No.: 14/708,890

(22) Filed: May 11, 2015

(65) Prior Publication Data

US 2016/0337391 A1 Nov. 17, 2016

(51) Int. Cl.
H04L 29/06 (2006.01)
H04L 12/26 (2006.01)

(52) U.S. Cl.
CPC .......... H04L 63/1433 (2013.01); H04L 43/04 (2013.01); H04L 63/145 (2013.01); H04L 63/1416 (2013.01)

(58) Field of Classification Search
CPC . H04L 63/1433; H04L 43/04; H04L 63/1416; H04L 63/145; H04L 63/04
USPC ........................................................ 726/23
See application file for complete search history.

(56) References Cited

U.S. PATENT DOCUMENTS

| 8,516,585 | B2 | 8/2013 | Cao et al. |
| 8,631,489 | B2 | 1/2014 | Antonakakis et al. |
| 8,631,498 | B1 | 1/2014 | Hart et al. |
| 8,661,544 | B2 * | 2/2014 | Yen ................... H04L 29/12066 726/24 |
| 9,516,039 | B1 * | 12/2016 | Yen .......................... H04L 63/14 |
| 2011/0167495 | A1 * | 7/2011 | Antonakakis ......... G06F 21/577 726/23 |
| 2012/0042381 | A1 * | 2/2012 | Antonakakis ....... H04L 63/1483 726/22 |
| 2013/0191915 | A1 | 7/2013 | Antonakakis et al. |
| 2014/0075558 | A1 | 3/2014 | Ward et al. |

(Continued)

OTHER PUBLICATIONS

M. Antonakakis, R. Perdisci, et al. From Throw-Away Traffic to Bots: Detecting the Rise of DGA-Based Malware. 21th USENIX Security Symposium. Aug. 2012. 16 pages.

(Continued)

Primary Examiner — Kambiz Zand
Assistant Examiner — Tongoc Tran
(74) Attorney, Agent, or Firm — Edell, Shapiro & Finnan, LLC

(57) ABSTRACT

Apparatus and techniques for determining whether a domain name has been generated by a domain generation algorithm (DGA) are disclosed. A first domain name is classified as either a likely domain generation algorithm (DGA) domain name or a likely non-DGA domain name, based on one or more features of the first domain name. In addition, statistics are determined regarding requests for the first domain name. Additional domain names are identified that share an infrastructure with the first domain name. A determination is made regarding whether the first domain name and/or one or more of the additional domain names are likely to have been generated by a DGA, based on a result of one or more of the classifying, the statistics, or the identifying. A security vulnerability related to one or more of the likely DGA domain names is then mitigated.

20 Claims, 7 Drawing Sheets

(56) References Cited

U.S. PATENT DOCUMENTS

2016/0055335 A1* 2/2016 Herwono ............ H04L 63/1408
                                                                                    726/23

OTHER PUBLICATIONS

M. Thomas and A. Mohaisen. Kindred domains: detecting and clustering botnet domains using DNS traffic. WWW Companion '14. Apr. 2014. 6 pages.

Tracking and Characterizing Botnets Using Automatically Generated Domains. http://arxiv.org/pdf/1311.5612.pdf, Nov. 21, 2013, 14 pages.

Raghuram, Jayaram, David J. Miller, and George Kesidis. "Unsupervised, low latency anomaly detection of algorithmically generated domain names by generative probabilistic modeling." Journal of Advanced Research 5.4 (2014): 423-433, Jan. 9, 2014, 11 pages. http://www.sciencedirect.com/science/article/pii/S2090123214000022.

Detecting Algorithmically Generated Domain-Flux Attacks With DNS Traffic Analysis, by Yadav, S., et al. http://conferences.sigcomm.org/imc/2010/papers/p48.pdf, 15 pages.

H. Guerid, K. Mittig, et al. Privacy-Preserving Domain-Flux Botnet Detection in a Large Scale Network. COMSNETS 2013. Jan. 2013, 9 pages.

Columbo, E. Cerberus: Detection and characterization of automatically generated malicious domains. Thesis. Apr. 2014, 134 pages.

\* cited by examiner

DETECTING DOMAINS GENERATED BY A DOMAIN GENERATION ALGORITHM

TECHNICAL FIELD

The present disclosure relates to information security.

BACKGROUND

Some types of malware, when installed on a computer, are configured to contact a controller in order to receive instructions. A particular domain name may be registered and used as a rendezvous point at which the instructions may be obtained by the malware. A single unchanging domain name, however, can generally be identified by authorities and, as such access to that domain name can then be blocked. This would normally thwart the malware.

Over the last several years, however, malware authors have leveraged Domain Generation Algorithms (DGAs) to avoid the use of unchanging domain names. Some malware uses these algorithms to generate thousands of domains per day, one or more of which can be leveraged by the malware authors for command and control purposes. The malware author knows the DGA, and therefore knows one of the domain names that will be generated. He may then register this domain name. The infected computer will then execute the DGA, and try to contact at least some of the generated domain names. Most of these attempts will fail, given that most of the generated domain names are not registered and not active. When and if the subverted computer tries to access the domain name registered by the malware author, however, this access can succeed. Using this domain name, the infected computer can make contact and receive instructions, thereby allowing the malware to proceed. The threat posed by this arrangement is exacerbated by the fact that many computers can be infected in this way and then enabled to operate collectively in a concerted manner as a so-called "botnet."

A DGA can generate hundreds or thousands of domain names per day. Unless the DGA is known or poorly designed, it is difficult for security products or authorities to determine which domains to block. To further complicate protection efforts, a domain chosen by the malware author may only be active for a single day; after that, the malware can generate another block of domain names the following day. In this situation, countermeasures can only be effective for a day, if at all.

DESCRIPTION OF EXAMPLE EMBODIMENTS

Overview

Apparatus and techniques are described herein for determining whether a domain name has been generated by a domain generation algorithm (DGA). A first domain name is classified as either a likely DGA domain name or a likely non-DGA domain name, based on one or more features of the first domain name. In addition, statistics are determined regarding requests for the first domain name. Additional domain names are identified that share an infrastructure with the first domain name. A determination is made regarding whether the first domain name and/or one or more of the additional domain names are likely to have been generated by a DGA, based on a result of one or more of the classifying, the statistics, or the identifying. A security vulnerability related to one or more of the likely DGA domain names is then mitigated.

Example Embodiments

Figure 1:
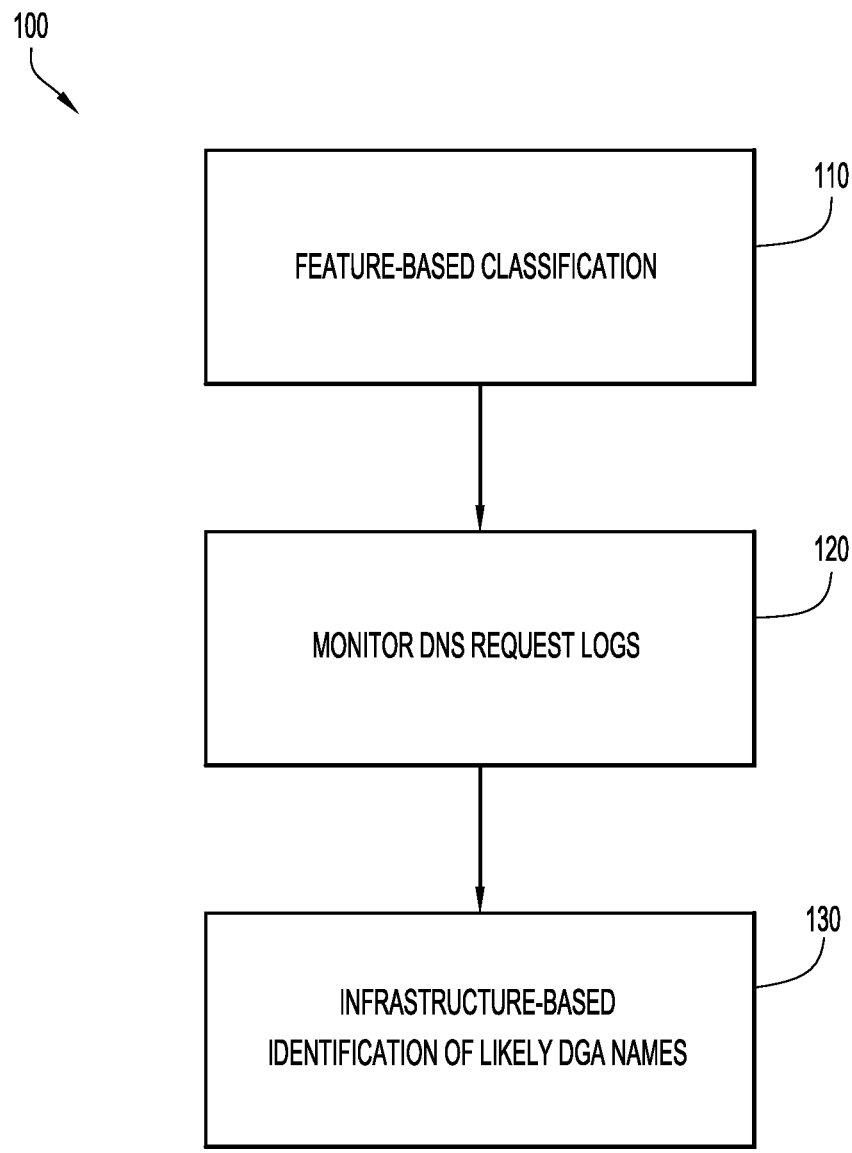
FIG. 1 is a flowchart illustrating the processing described herein, according to an example embodiment.

The process of identifying a domain name as one that has been generated by a DGA is illustrated in FIG. 1, according to an embodiment. At 110, a set of possible DGA domain names is classified into two subsets. One subset consists of likely DGA domain names and the second consists of likely non-DGA domain names. The classification process is based on features of each of the possible domain names. As will be described in greater detail below, in an embodiment the classification process includes evaluation of one or more features of each domain name under consideration, where the features pertain to the character string representing the domain name. For each possible DGA domain name, the features of the domain name are compared to those of known DGA domain names; the features are also compared to those of known non-DGA domain names. The comparison results are used to classify the possible DGA domain names into those that are likely to be DGA domain names and those that are likely to be non-DGA domain names.

At 120, logs of DNS requests are analyzed for likely DGA domain names, in an embodiment. Generally, such logs are maintained for network management purposes. These DNS request logs may be maintained by service or equipment providers, for example. The number of access attempts for each likely DGA domain name may be noted over time. Spikes in the number of access attempts may be observed, for example, where a relatively large number of access attempts are made over a relatively brief period of time. Such phenomena may be detected and characterized using a variety of statistics. Spikes having particular statistical profiles can be characteristic of DGA domain names, for example. A pronounced lack of DNS requests for a domain name can also be an indicator, in situations where a domain has been registered but not yet activated. In an embodiment, a domain name lacking a suspicious profile may no longer be considered a likely DGA domain name. In some cases, operation 120 may therefore serve to pare down the number of likely DGA domain names generated by operation 110.

At 130, for each likely DGA domain name, the infrastructure used by the domain name is examined to identify other domain names that use the same infrastructure. If another domain name shares the same infrastructure used by a likely DGA domain name, the other domain name may also be a likely DGA domain name. The infrastructure may include a name server used by the likely DGA domain name, for example and without limitation; other network elements may also be considered as part of this infrastructure. In some cases, operation 130 may add to the set of likely DGA domain names.

As the term is used herein, "infrastructure" also refers to information related to the creation or administration of a likely DGA domain name. Such information may be collected and analyzed to discover other likely DGA domain names that may be associated with this data. Examples of such information may include IP addresses used by likely DGA domain names, domain registration data (such as email addresses, names of the person(s) or organization who registered the domain, telephone numbers, and physical mailing addresses), and malware executable files themselves, which may contain the DGA logic. In the case of malware executable files, these files can be executed in a sandbox environment and data collected from the execution process. This collected data may include domain names that the malware has contacted. By searching this data for a suspected DGA domain, other domains can be uncovered, where the malware has tried to contact these domains. The above pieces of information related to a likely DGA domain name are intended as examples, and are not meant to be limiting.

The result of the processing of FIG. 1 is a set of likely DGA domain names. In various embodiments, one or more of operations 110-130 may be repeated to further refine this set, as will be described below. Once a set of likely DGA domain names is finalized, this information may be used by authorities or by security software to block access to the likely DGA domain names. Other actions may also be taken, in addition to or instead of blocking access. If an attempt is made to access a likely DGA domain name, the event may be logged and/or an alarm condition may be asserted, for example.

Figure 2:
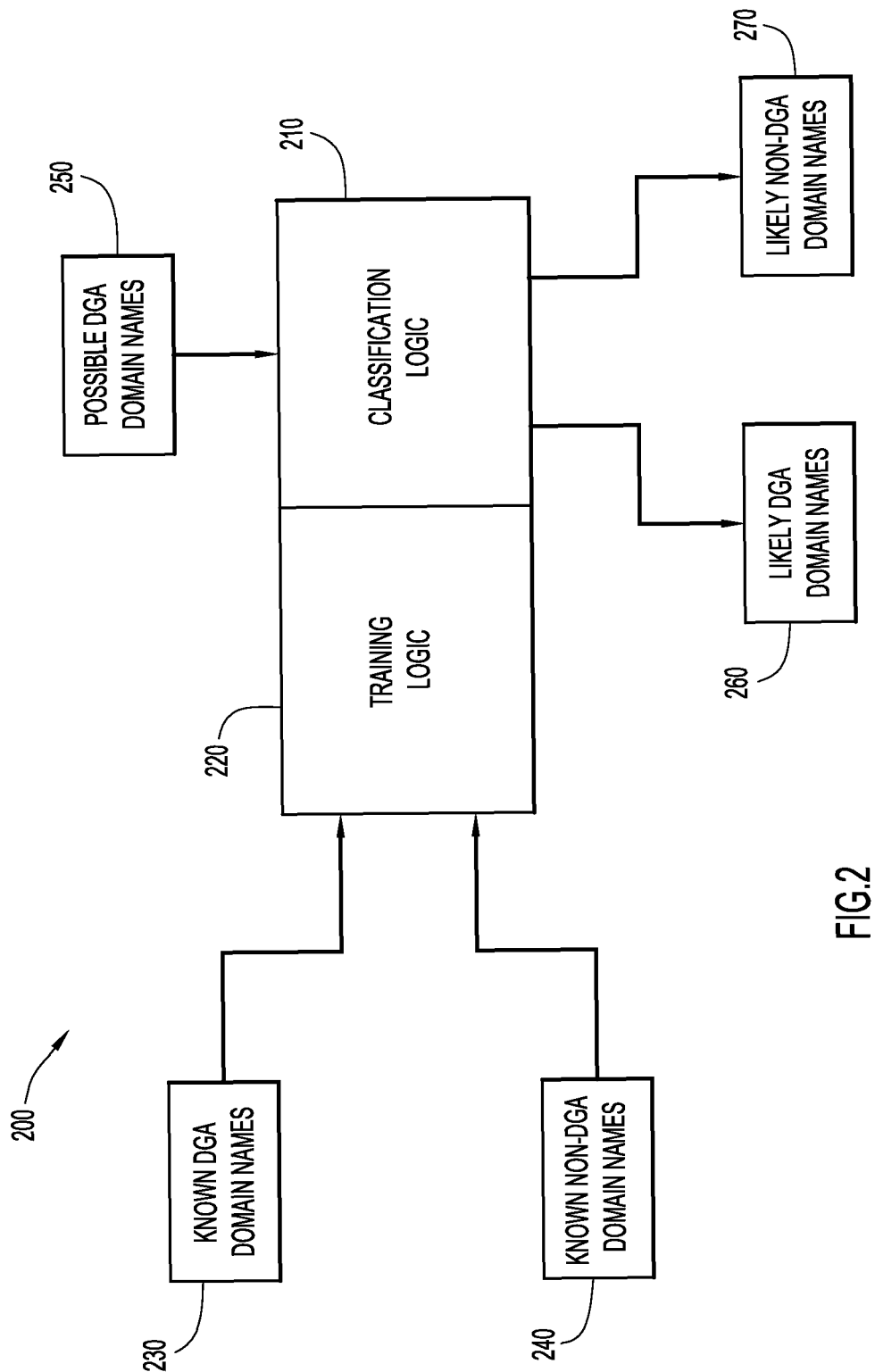
FIG. 2 illustrates logic for classifying a domain name as a likely DGA domain name, according to an example embodiment.

Operation 110 may be implemented using a system such as that shown in FIG. 2, according to an embodiment. Classification logic 210 is configured to receive a set of possible DGA domain names 250 and classify these names into a set of likely DGA-domain names 260 and a set of likely non-DGA domain names 270. The possible DGA domain names 250 may be provided by an analyst or user, and may represent suspected DGA domain names. Classification logic 210 may perform the classification by extracting and evaluating features of each of the possible DGA domain names 250. This evaluation may, for example, consider the features of the character strings representing the respective possible domain names 250.

In the illustrated embodiment, training is performed on the classification logic 210 prior to its operation. A set of known DGA domain names 230 and a set of known non-DGA domain names 240 are used to train the classification logic 210. Training logic 220 receives known DGA domain names 230 and known non-DGA domain names 240. Relevant features of these names are extracted. Training logic 220 then uses the features of these names to inform the classification logic 210 as to the respective features of DGA domain names and non-DGA domain names. The training process therefore serves to configure the classification logic 210, enabling classification logic 210 to classify the possible DGA domain names 250.

In particular, the training process may start with the input of the set of known DGA domain names 230 and the set of known non-DGA domain names 240 to the training logic 220. Features are then extracted from the domain names; some of these features are listed below with respect to reference 350 of FIG. 3. These features, along with respective labels indicating whether they suggest a DGA domain name or a non-DGA domain name, are used as inputs to a machine learning algorithm which builds a model to differentiate between the two classes of data (DGA and non-DGA domain names), according to an embodiment. The model which best balances the ability to properly label DGA domains and non-DGA domains is chosen. Model validation may also be done at this stage to ensure that the chosen model is able to generalize beyond the training data.

In various embodiments, the training logic 220 and classification logic 210 may be implemented in software, firmware, hardware, or some combination thereof. In an embodiment, classification logic 210 may include artificial intelligence logic.

Figure 3:
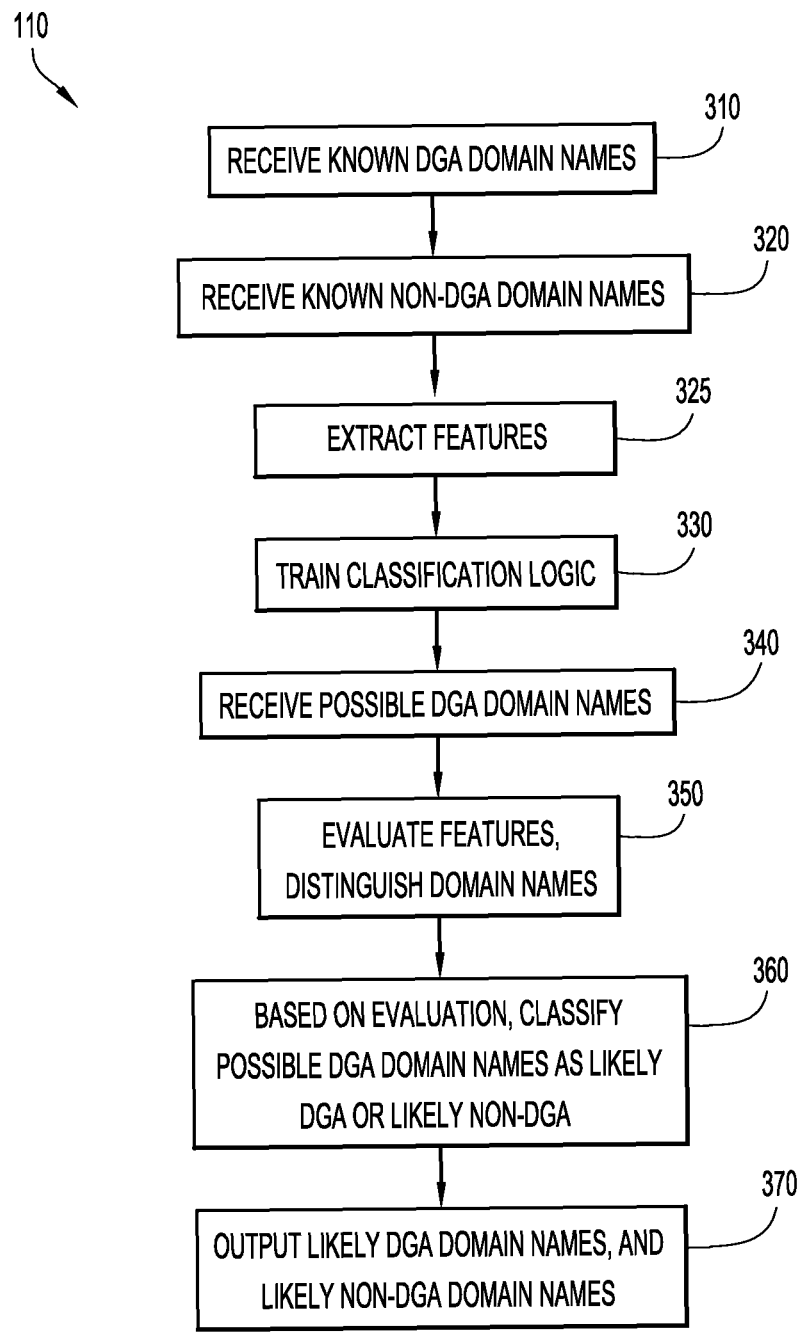
FIG. 3 is a flowchart illustrating a classification process, according to an example embodiment.

The classification process (110 of FIG. 1) is illustrated further in FIG. 3, according to an embodiment. At 310, a set of known DGA domain names is received. At 320, a set of known non-DGA domain names is received. The domain names received at 310 and 320 are used for purposes of training the classification logic. Features of these received domain names are extracted at 325, and the training is performed at 330 as discussed above. At 340, a set of possible DGA domain names is received.

At 350, features of each of the possible DGA domain names are extracted and evaluated. As noted above, this evaluation may consider the character strings of each respective possible DGA domain name. Any or all of the following features may be evaluated:

Shannon entropy
Length
Mean of the ASCII values of the characters
Standard deviation
Skew
Kurtosis
Dispersion index
Percentage of characters that are alphabetic
Percentage of characters that are numeric
Number of characters that are numeric
Whether the domain name starts with a number
Number of dashes
Consonant to vowel ratio
n-gram metrics, where 1≤n≤k (In an embodiment, k=4)
Rare letter score
Common letter score
Length of the longest consecutive string of consonants
Length of the longest consecutive string of vowels
Viterbi decomposition of the domain name into likely component words The above features are presented here as examples and are not meant to be limiting.

At 360, for each possible DGA domain name, some or all of the features above may be used by the trained classification logic to classify this name as either a likely DGA domain name or a likely non-DGA domain name. At 370, the likely DGA domain names are output and the likely non-DGA domain names are output.

Figure 4:
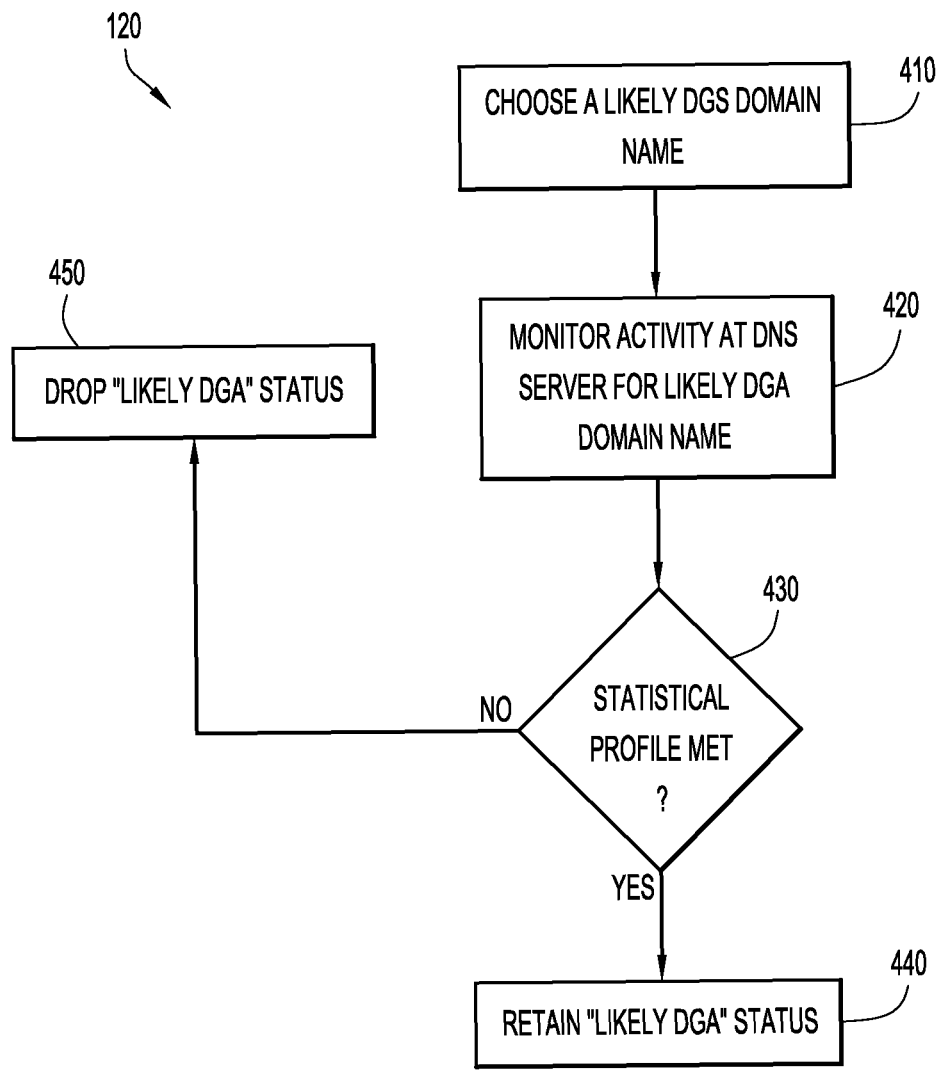
FIG. 4 is a flowchart illustrating a process for monitoring and evaluating activity at a DNS server, according to an example embodiment.

The monitoring of a request log of a DNS server (120 of FIG. 1) is illustrated in FIG. 4, according to an embodiment. The monitoring process may be performed for any or all of the likely DGA domain names. At 410, one of the likely DGA domain names is chosen. At 420, activity across one or more DNS servers is monitored for requests to the likely DGA domain. Such activity can be observed one or more request logs corresponding to the DNS server(s). The objective is to detect the amount of access that is being attempted for this domain over time. The access attempts, if they collectively meet one or more predefined statistical profiles or thresholds consistent with a DGA domain name, represent further evidence that this domain name is a DGA domain name. A determination is made at 430 as to whether this domain name meets a statistical profile. If so, then at 440 this domain name retains its status as a likely DGA domain name. If not, then at 450 this domain name loses its status as a likely DGA domain name.

Figure 5:
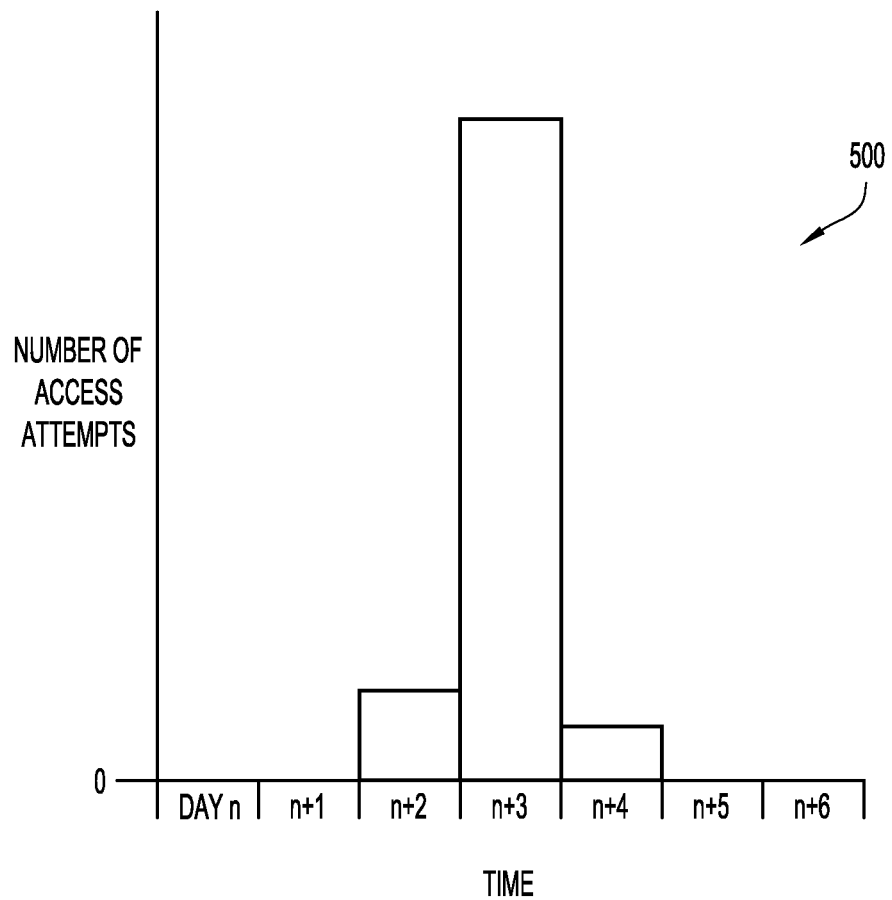
FIG. 5 illustrates an example of data that shows access attempts for a domain name over time, according to an example embodiment.

Generally, a DGA domain name will have a relatively large number of access attempts from infected computers within a short period, e.g., one day. If the number of access attempts is graphed over time, this phenomenon may appear as a bump or spike. This is illustrated in FIG. 5. In this illustration, the number of attempted access attempts for a domain name is relatively high on day n+3. There are significantly fewer attempts on days n+2 and n+4, and few or none on any other days. DGA domain names tend to be used only briefly; before and after that, other DGA domain names are generated and used. Therefore such a profile suggests that this domain name may be a DGA domain name. Note that activity detected on non-peak days may be due to security analysis being performed with respect to the DNS server, or synchronization issues of a system clock.

There are several statistics which may be collected in order to identify such a spike. To begin, the median number of requests per day may be noted. The maximum number of requests per day may also be recorded. The number of days since DNS requests were first seen may be recorded. Various statistics related to outlier values may also be significant. These would include statistics related to requests on days apart from the day of an apparent spike. In the example of FIG. 5, such statistics would relate to access attempts on days other than day n+3. For example, values that are relatively distant from the mean, e.g., beyond four standard deviations, may be considered. Values that are relatively distant from the median, e.g., beyond four times the median absolute deviation, may be considered. Values that are above the upper quartile, e.g., past the upper quartile by a distance of three times the interquartile range, may also be considered. The statistics defined here are presented as examples, without limitation. Any or all of these statistics, as well as others known to persons of ordinary skill in the art, may be used to define criteria for a spike that represents access to a DGA domain name. In an embodiment, thresholds may be defined for some or all of these statistics; if these thresholds (or some subset of these thresholds) are met, then the DGA domain name in question may be treated as a likely DGA domain name.

Figure 6:
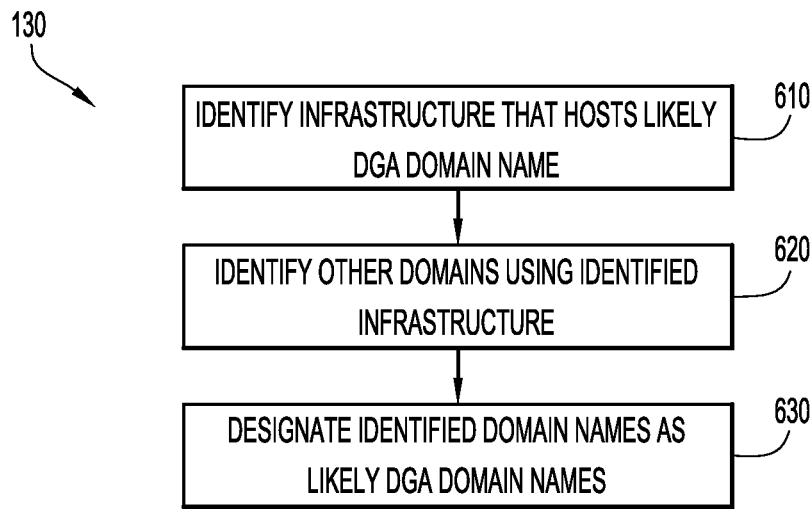
FIG. 6 is a flowchart illustrating a process for identifying additional likely DGA domain names, according to an example embodiment.

Operation 130 of FIG. 1, the identification of likely DGA domain names through examination of infrastructure used by other likely DGA domain names, is illustrated in greater detail in FIG. 6 according to an embodiment. At 610, for a likely DGA domain name, the infrastructure supporting this domain name is identified. Such infrastructure may include, for example, a name server that is used for this domain name. When this infrastructure is identified, there is some likelihood that other domain names using this infrastructure may be DGA domain names. Therefore, at 620, other domain names that use this infrastructure are identified. At 630, the domain names identified at 620 are designated as likely DGA domains.

As noted above, information related to a likely DGA domain name may also be considered as part of the infrastructure, and analyzed to discover other likely DGA domain names in an embodiment. Examples of such information may include IP addresses used by likely DGA domain names, domain registration data (such as email addresses, names of the person(s) or organization who registered the domain, telephone numbers, and physical mailing addresses), and malware executable files themselves, which contain the DGA logic.

Figure 7:
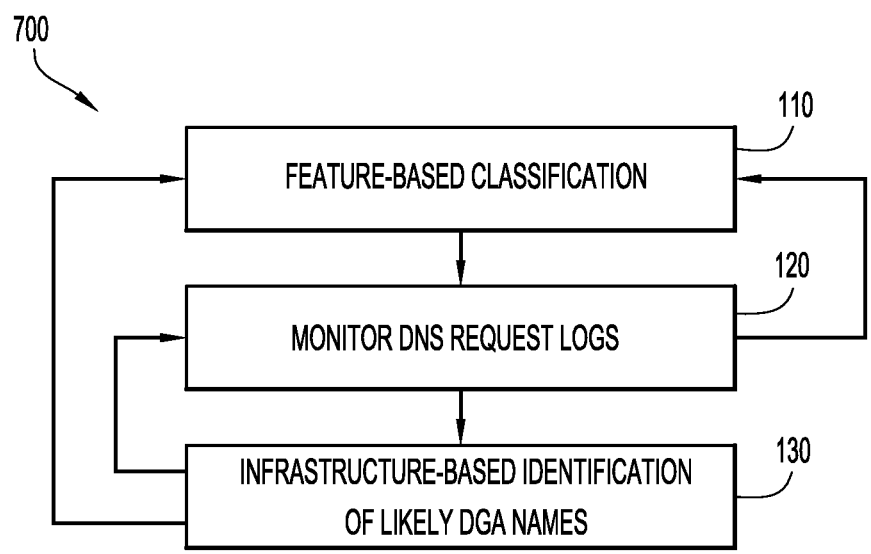
FIG. 7 is a flowchart illustrating alternative sequences for the processing described herein, according to an example embodiment.

Referring again to FIG. 1, the illustrated sequence should not be construed as limiting; the operations may, in alternative embodiments, be performed in a different sequence. Moreover, after completing some or all of the operations, one or more of the operations may be repeated. Some of these possibilities are illustrated in FIG. 7. If, for example, the sequence of operations 110, 120, and 130 is completed, then some or all of the set of likely DGA domain names may be refined by repeating 110. It may be advantageous, for example, to take the likely DGA domain names that were found in 130 to be sharing infrastructure with previously identified likely DGA domain names, and subject these to the feature-based classification process of 110. The resulting set of likely DGA domain names may then be subjected to operation 120, so that attempts to access these domains may be monitored for statistical patterns in the number and timing of access attempts. This would further refine the list of likely DGA domain names. Moreover, the list of likely DGA domain names resulting from operation 120 may be further refined by subjecting them to the operation of 110.

Alternatively, some or all of the likely DGA domain names resulting from operation 130 may be subjected to operation 120. Here, access to the likely DGA domain names that were found in 130 to be sharing infrastructure with previously identified likely DGA domain names may be monitored. In this manner, attempts to access these domain names may be monitored for statistical patterns in the number and timing of access attempts. Again, this would further refine the list of likely DGA domain names.

The possible sequences identified above are presented as examples, and are not meant to be limiting. Other permutations are possible, as would be understood by a person of ordinary skill in the art. Moreover, the control of such sequencing may be performed by the control of a user, or may be controlled in an automated manner by software.

Once a set of likely DGA domain names is finalized, procedures may be performed to block access to these domains or otherwise mitigate security vulnerabilities that might be created or exploited by a DGA domain name. This blocking may be performed by an administrator or by software running under the control of an administrator. In this way, malware that is trying to obtain instructions through these domains will be unable to do so. In alternative embodiments, other actions may be performed to mitigate such vulnerabilities, instead of or in addition to blocking access; such actions may include logging of such access attempts and/or assertion of an alarm condition, as noted above.

Figure 8:
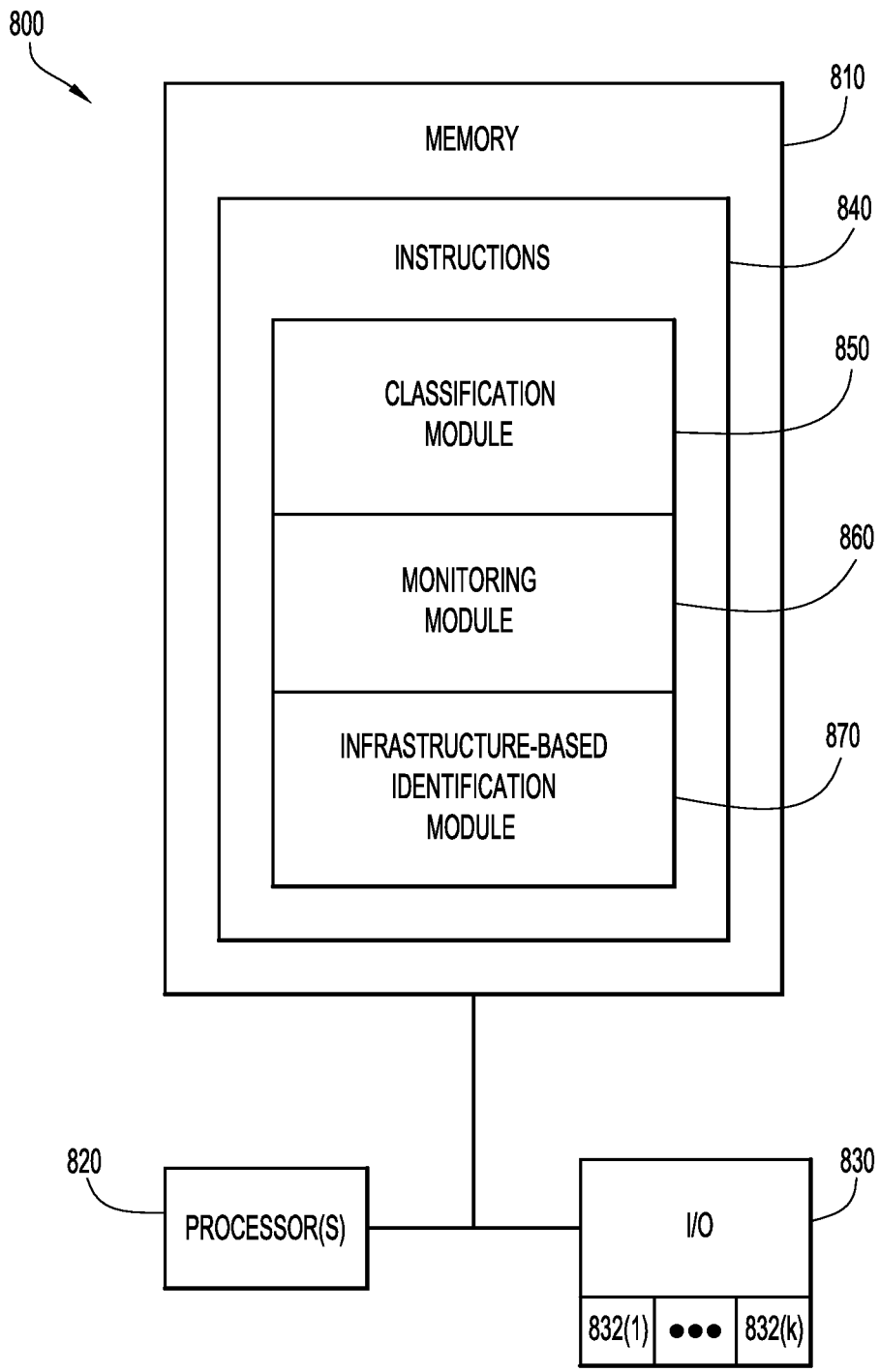
FIG. 8 is a block diagram illustrating a software or firmware implementation of the processing described herein as executed by one or more programmable processors, according to example an embodiment.

In an embodiment, the processing described above may be implemented in one or more programmable processors executing software or firmware (or a combination thereof). A software or firmware embodiment of these operations is illustrated in FIG. 8. A computing system 800 includes one or more memory devices, shown collectively as memory 810. Memory 810 is in communication with one or more processors 820 and with one or more input/output units 830. An example of an I/O unit is a network processor unit that may have associated network ports or other communications ports 832(1)-832(k). In an embodiment, I/O 830 allows a user to interface with and control the execution of instructions 840. I/O 830 may also connect to network components, such as DNS servers. The I/O 830 may include one or more Application Specific Integrated Circuits (ASICs) that are configured with digital logic gates to perform various networking and security functions. In an embodiment, the system 800 may be embodied in a personal computer, workstation, or other computing system or device. In alternative embodiments, the functionality of system 800 may be implemented across a distributed or networked computing system or a cluster of computing systems, where the resources illustrated in FIG. 8 reside and operate in a plurality of physical or logical locations.

Memory 810 may comprise, but is not limited to comprising, read only memory (ROM), random access memory (RAM), magnetic disk storage media devices, optical storage media devices, flash memory devices, electrical, optical, or other physically tangible (i.e., non-transitory) memory storage devices. Memory 810 stores data as well as executable instructions 840. Instructions 840 are executable on processor(s) 820. The processor(s) 820 comprise, for example, a microprocessor or microcontroller that executes instructions 840. Thus, in general, the memory 810 may comprise one or more tangible (non-transitory) computer readable storage media (e.g., memory device(s)) encoded with software or firmware that comprises computer executable instructions. When the instructions are executed (by the processor(s) 820) the software or firmware is operable to perform the operations described herein.

In the illustrated embodiment, the executable instructions 840 may include several logic modules. These include a classification module 850 responsible for receiving possible domain names and evaluating their features, then classifying them as either likely DGA domain names or likely non-DGA domain names. In an embodiment, classification module 850 includes the training logic 220 and classification logic 210 shown in FIG. 2, and performs the processing described above with respect to FIG. 2. Executable instructions 840 may also include a monitoring module 860 responsible for monitoring one or more request logs for DNS servers responsible for a given likely DGA domain name, as described above with respect to FIG. 4. This may include, for example, observing and characterizing the number of accesses directed to the DNS server for this likely domain name. Executable instructions 840 may also include an infrastructure-based identification module 870. This module may be responsible for identifying domain names that share network infrastructure with a likely DGA domain name, as described above with respect to FIG. 6.

A method is described herein, comprising: at a computing device, classifying a first domain name as either a likely domain generation algorithm (DGA) domain name or a likely non-DGA domain name, based on one or more features of the first domain name; determining statistics regarding requests for the first domain name; identifying any additional domain names that share an infrastructure with the first domain name; determining whether one or more of the first domain name and one or more of the additional domain names are likely to have been generated by a DGA, based on a result of one or more of the classifying, the statistics, or the identifying; and mitigating a security vulnerability related to one or more of the likely DGA domain names.

An apparatus is also described herein, comprising: one or more processors; one or more memory devices in communication with the one or more processors; and a network interface unit in communication with the one or more processors. The one or more processors are configured to: classify a first domain name as either a likely domain generation algorithm (DGA) domain name or a likely non-DGA domain name, based on evaluation of one or more features of the first domain name, resulting in a classification of the first domain name; determine statistics regarding requests for the first domain name; identify any additional domain names that share an infrastructure with the first domain name resulting in an identification of additional domain names; and determine whether one or more of the first domain name and one or more of the additional domain names are likely to have been generated by a DGA, based on the classification, the identification, or the statistics, in order to mitigate a security vulnerability related to one or more of the likely DGA domain names.

One or more computer readable non-transitory storage media are also described herein. The media is encoded with software comprising computer executable instructions that when executed by one or more processors, cause the one or more processors to: classify a first domain name as either a likely domain generation algorithm (DGA) domain name or a likely non-DGA domain name, based on evaluation of one or more features of a first domain name, resulting in a classification of the first domain name; determine statistics regarding requests for the first domain name; and identify any additional domain names that share an infrastructure with the first domain name, resulting in an identification of additional domain names. The computer executable instructions further cause the processor to determine whether one or more of the first domain name and one or more of the additional domain names are likely to have been generated by a DGA, based on the classification, the identification, or the statistics in order to mitigate a security vulnerability related to one or more of the likely DGA domain names.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Functional building blocks are used herein to illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed. The breadth and scope of the claims should not be limited by any of the example embodiments disclosed herein.

What is claimed is:

1. A method comprising:
    at a computing device, classifying each one of first domain names as either a likely domain generation algorithm (DGA) domain name or a likely non-DGA domain name, based on one or more features of the first domain names, the classifying producing a first pool of likely DGA domain names;
    determining statistics regarding requests for the likely DGA domain names in the first pool to identify a second pool of likely DGA domain names out of the first pool, wherein, for each of the likely DGA domain names in the second pool, the statistics of the requests indicate a spike over a period of time, wherein a number of the likely DGA domain names in the second pool is less than a number of the likely DGA domain names in the first pool;

identifying additional domain names that share an infrastructure with the likely DGA domain names in the second pool; and mitigating a security vulnerability related to one or more of the likely DGA domain names in the second pool and the additional domain names.

2. The method of claim 1, further comprising:
training classification logic to perform the classifying of the first domain names.

3. The method of claim 1, wherein the mitigating comprises one or more of:
blocking access to domains identified by the one or more of the likely DGA domain names in the second pool and the additional domain names;
monitoring access to the domains identified by the one or more of the likely DGA domain names in the second pool and the additional domain names; or
asserting an alarm condition in response to access to the domains identified by the one or more of the likely DGA domain names in the second pool and the additional domain names.

4. The method of claim 1, wherein classifying comprises evaluating one or more properties of a string of characters in the first domain names.

5. The method of claim 1, wherein the determining the statistics regarding the requests for the likely DGA domain names in the first pool comprises:
determining statistics regarding requests for the likely DGA domain names in the first pool to identify a third pool of likely DGA domain names for which no requests are received over a period of time, wherein a number of likely DGA domain names in the third pool is less than a number of the likely DGA domain names in the first pool.

6. The method of claim 1, wherein the identifying of additional domain names that use the infrastructure comprises identifying additional domain names that use a domain name server also used by one of the likely DGA domain names in the second pool.

7. The method of claim 1, further comprising, repeating one or more of the classifying, determining, or identifying, with respect to a second domain name, where the second domain name is one of the likely DGA domain names in the second pool, or one of the additional domain names.

8. An apparatus comprising:
one or more processors;
one or more memory devices in communication with the one or more processors; and
a network interface unit in communication with the one or more processors,
wherein the one or more processors are configured to:
classify each one of first domain names as either a likely domain generation algorithm (DGA) domain name or a likely non-DGA domain name, based on evaluation of one or more features of the first domain names, producing a first pool of likely DGA domain names;
determine statistics regarding requests for the likely DGA domain names in the first pool to identify a second pool of likely DGA domain names out of the first pool, wherein, for each of the likely DGA domain names in the second pool, the statistics of the requests indicate a spike over a period of time, where a number of the likely DGA domain names in the second pool is less than a number of the likely DGA domain names in the first pool;

identify additional domain names that share an infrastructure with the likely DGA domain names in the second pool; and
mitigate a security vulnerability related to one or more of the likely DGA domain names in the second pool and the additional domain names.

9. The apparatus of claim 8, wherein the one or more processors are configured to train classification logic to classify the first domain names.

10. The apparatus of claim 8, wherein the one or more processors are configured to mitigate the security vulnerability by:
blocking access to domains identified by the one or more of the likely DGA domain names in the second pool and the additional domain names;
monitoring access to the domains identified by the one or more of the likely DGA domain names in the second pool and the additional domain names; or
asserting an alarm condition in response to access to the domains identified by the one or more of the likely DGA domain names in the second pool and the additional domain names.

11. The apparatus of claim 8, wherein the one or more processors are configured to classify the first domain name by evaluating one or more properties of a string of characters in the first domain names.

12. The apparatus of claim 8, wherein one or more processors are configured to determine the statistics regarding the requests for the likely DGA domain names in the first pool to identify a third pool of likely DGA domain names for which no requests are received over a period of time, wherein a number of likely DGA domain names in the third pool is less than a number of the likely DGA domain names in the first pool.

13. The apparatus of claim 8, wherein the one or more processors are configured to identify additional domain names that use the infrastructure by identifying additional domain names that use a domain name server also used by one of the likely DGA domain names in the second pool.

14. The apparatus of claim 8, wherein the one or more processors are further configured to:
classify a second domain name as either a likely DGA domain name or a likely non-DGA domain name, based on evaluation of one or more features of the second domain name;
determine statistics regarding requests for the second domain name; or
identify additional domain names that share an infrastructure with the second domain name, where the second domain name is one of the likely DGA domain names in the second pool or one of the additional domain names.

15. One or more computer readable non-transitory storage media encoded with software comprising computer executable instructions that when executed by one or more processors, cause the one or more processors to:
classify each one of first domain names as either a likely domain generation algorithm (DGA) domain name or a likely non-DGA domain name, based on evaluation of one or more features of the first domain names, producing a first pool of likely DGA domain names
determine statistics regarding requests for the likely DGA domain names in the first pool to identify a second pool of likely DGA domain names out of the first pool, wherein, for each of the likely DGA domain names in the second pool, the statistics of the requests indicate a spike over a period of time, wherein a number of the likely DGA domain names in the second pool is less than a number of the likely DGA domain names in the first pool;

identify additional domain names that share an infrastructure with the likely DGA domain names in the second pool; and mitigate a security vulnerability related to one or more of the likely DGA domain names in the second pool and the additional domain names.

16. The computer readable non-transitory storage media of claim 15, wherein the executable instructions further cause the one or more processors to train classification logic to classify the first domain names.

17. The computer readable non-transitory storage media of claim 15, wherein the executable instructions that cause the one or more processors to mitigate the security vulnerability comprise executable instructions that cause the one or more processors to perform one or more of:

blocking access to domains identified by the one or more of the likely DGA domain names in the second pool and the additional domain names;

monitoring access to the domains identified by the one or more of the likely DGA domain names in the second pool and the additional domain names; or asserting an alarm condition in response to access to the domains identified by the one or more of the likely DGA domain names in the second pool and the additional domain names.

18. The computer readable non-transitory storage media of claim 15, wherein the executable instructions that, when executed by the one or more processors, cause the one or more processors to classify the first domain names, comprise executable instructions that, when executed by the one or more processors, cause the one or more processors to evaluate one or more properties of a string of characters in the first domain names.

19. The computer readable non-transitory storage media of claim 15, wherein the executable instructions, which, when executed by the one or more processors cause the one or more processors to:

determine the statistics regarding the requests for the likely DGA domain names in the first pool to identify a third pool of likely DGA domain names for which no requests are received over a period of time, wherein a number of likely DGA domain names in the third pool is less than a number of the likely DGA domain names in the first pool.

20. The computer readable non-transitory storage media of claim 15, wherein the executable instructions, which when executed by the one or more processors cause the one or more processors to identify additional domain names that use a domain name server also used by one of the likely DGA domain names in the second pool.

\* \* \* \* \*